United States Patent [19]

Flagg

[11] 3,963,250
[45]* June 15, 1976

[54] CHUCK

[75] Inventor: Richard Edward Flagg, E. Bridgewater, Mass.

[73] Assignee: Double E Company, Inc., Brocton, Mass.

[ * ] Notice: The portion of the term of this patent subsequent to Feb. 19, 1991, has been disclaimed.

[22] Filed: Aug. 24, 1973

[21] Appl. No.: 391,327

Related U.S. Application Data

[63] Continuation-in-part of Ser. No. 240,435, April 3, 1972, Pat. No. 3,792,868.

[52] U.S. Cl. ............................. 279/2 R; 242/72 R; 269/48.1
[51] Int. Cl.² ......................................... B23B 31/40
[58] Field of Search ............. 279/2; 242/72 R, 72.1; 269/48.1; 82/44

[56] References Cited
UNITED STATES PATENTS

| | | | |
|---|---|---|---|
| 509,159 | 11/1893 | Giles | 242/72.1 |
| 2,211,471 | 8/1960 | Klein | 242/72 |
| 3,667,697 | 6/1972 | Binder | 242/72 |
| 3,792,868 | 2/1974 | Flagg | 279/2 |

FOREIGN PATENTS OR APPLICATIONS 262,608   7/1949   Switzerland ............................. 279/2

Primary Examiner—Othell M. Simpson
Assistant Examiner—Z. R. Bilinsky

[57] ABSTRACT

A chuck for internally gripping a hollow member comprising an interior member having a longitudinal axis and including a plurality of generally planar exterior surfaces each parallel to the axis; a plurality of rollers, each roller parallel to and in contact with one of those surfaces; a plurality of jaw members, each having an arcuate interior surface in contact with at least one of the rollers; and means for resiliently maintaining the jaw members in contact with the rollers.

15 Claims, 5 Drawing Figures

CHUCK

CROSS REFERENCE TO RELATED APPLICATION

This application is a continuation-in-part of U.S. Ser. No. 240,435 filed Apr. 3, 1972 and now U.S. Pat. No. 3,792,868, issued Feb. 19, 1974.

BACKGROUND OF THE INVENTION

This invention relates to the improvements in core chucks.

While there have been a number of chucks designed for use in a process where, for example, a roll of material must be locked to a supporting shaft or to machine arms, previous designs have suffered from one or more of a number of drawbacks: expensive to manufacture, difficult to maintain or service, non-automatic operation, operative only in one direction, short chuck lifetime, etc.

SUMMARY OF THE INVENTION

It is a principal object of the present invention to provide an improved chuck which is automatic in operation, inexpensive to manufacture, and which has improved stability of the chuck jaws.

Further objects include the provision of such a stable chuck which is operative irrespective of the sense of rotation of the member to be gripped, which is useable on existing roll-supporting shafts (rather than requiring its own specifically designed shaft), which is easily disassembled and reassembled, and which is of improved design so as to reduce wear on chuck components and to achieve ease engagement and disengagement of the chuck jaws with the member to be gripped.

To achieve these and other objects as will further appear, a chuck constructed according to the invention for internally gripping a hollow member comprises an interior member which has a longitudinal axis and which includes a plurality of generally planar exterior surfaces which are parallel to the axis. A plurality of rollers are provided, each roller being oriented parallel to, and in contact with, one of the exterior surfaces of the interior member. A plurality of jaw members are provided radially outwardly from the rollers. Each jaw member has an arcuate interior surface in contact with at least one of the rollers. Means are provided for resiliently maintaining the jaw members in contact with the rollers. Also provided are jaw orientation means which limit the relative rotational movement between a jaw member and an underlying roller. In preferred embodiments the jaw orientation means comprise a lug secured to that jaw member and projecting radially inwardly from the inner surface thereof for distance equal to at least ½ the diameter of the roller. Furthermore, there may be a plurality of such lugs on the jaw member in axially aligned, angularly-spaced pairs. To accomodate good-sized lugs, grooves may be provided in the interior member. In one preferred embodiment the means for resiliently maintaining the jaw members in contact with the rollers comprise a circumferentially disposed groove in the outer surface of each of said jaw members, the grooves being axialy aligned, one of the grooves being interrupted by a barrier, and a band spring disposed in the grooves with its opposite ends on opposite sides of the barrier.

In another aspect of the invention, a torque transmitting chuck is provided for internally gripping a hollow member and interconnecting that member with a second member maintained at a relative torque with respect to that member. The chuck comprises an interior member securable to said second member for rotation therewith and having a longitudinal axis and including a plurality of generally planar exterior surfaces each parallel to the axis. The exterior shape of the interior member, in its axially central region and in a cross-section taken perpendicular to said longitudinal axis, is a regular polygon. Also provided are a plurality of exterior jaw members for gripping the hollow member thereby to maintain a relative torque between the interior member and the jaw member. Each jaw member has an arcuate interior surface and the number of jaw members is no more than one-half the number of sides of the polygon. Means are disposed between the interior member and the jaw members which means includes elements contacting at least one of the group consisting of the interior member and the jaw members. All elements which so contact at least one of that group are disposed for only rolling contact therewith. Those elements comprise a plurality of rollers, each roller parallel to and in contact with both one of the generally planar surfaces and an arcuate interior jaw surface. At least two rollers are in contact with each arcuate interior jaw surface. Each roller extends longitudinally beyond at least one end of the associated jaw member to provide an exposed roller portion. The chuck further comprises means for resiliently maintaining the jaw members in contact with the rollers and roller orienting means which engage each exposed roller portion to maintain a predetermined circumferential spacing of the rollers.

Other objects, features, and advantages of the invention will appear from the following description of a particular preferred embodiment, taken together with the accompanying drawings.

Figure 2:
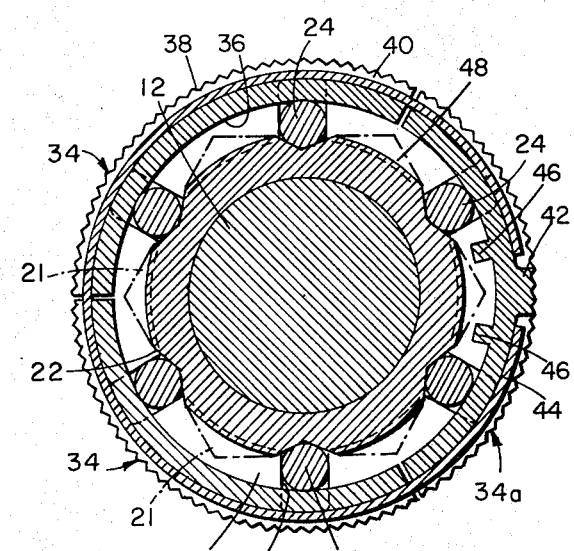
FIG. 2 is a sectional view taken at 2—2 of FIG. 1.

Referring to the drawings, the chuck 10 is rigidly maintained at a predetermined position on a conventional roll-supporting shaft 12 by means of a plurality of set screws 14 which extend through outer end rings 16 and through cylindrical end portions 18 of interior member 20. In the preferred form illustrated, the cross-sectional exterior shape of the portion of interior member 20 between cylindrical end portions 18 is a hexagon having six planar exterior surfaces 21 each parallel to the axis of member 20. Slight, longitudinally-disposed depressions 22 are provided in the center of each face 21 (best seen in FIG. 2). The depressions 22 are preferably V-shaped in section and have been exaggerated in depth in the drawings for clarity. Although the dimensions of depressions 22 may vary substantially and still achieve the benefits described below, typically for a 3 inch O.D. chuck they have a depth of about 0.020 inch and a width extending about one-half the distance across each face 21.

Figure 1:
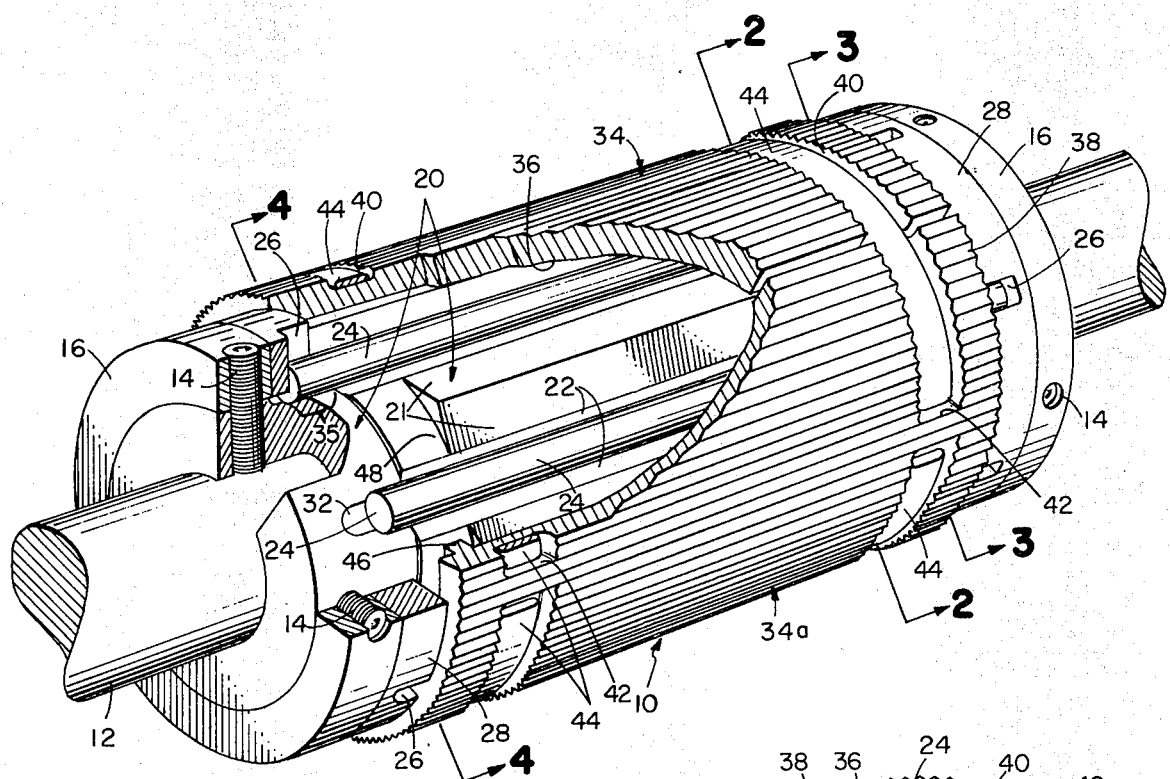
FIG. 1 is a partially broken away perspective view of a chuck including features according to the invention.
Figure 3:
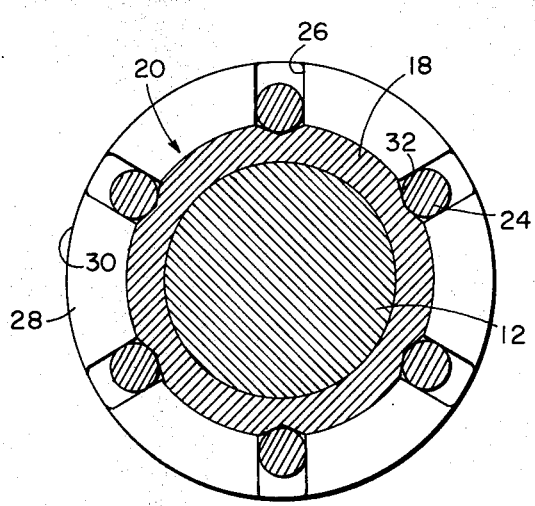
FIG. 3 is a sectional view taken at 3—3 of FIG. 1.

A roller 24 is disposed on each face 21 of the hexagon. Each roller extends beyond the longitudinally opposed ends of the hexagonal portion of member 20, to partially overlie the cylindrical end portions 18. The ends of each roller are disposed in recesses 26 in roller orienting rings 28 which are disposed about cylindrical portions 18 interior of end rings 16. As best seen in FIG. 3, each recess 26 has a smaller area at the radially outermost surface 30 of the roller orienting ring 28. The grooves 32 are cut into the exterior surface of cylindrical portions 18 of the interior member 20 to assure that the rollers 24 are in contact with the hexagonal portion of the member 20.

The surfaces 36, 21 and/or the surfaces of rollers 24 may be roughened or of differing textures to assure the rollers 24 will indeed roll, and not slide, on surfaces 36 and 21.

Jaw members 34 are disposed around the rollers 24 but are longitudinally shorter thereby providing exposed roller portions 35 for engagement by rings 28. Each of the three jaw members 34 has an arcuate inner surface 36 which is in contact with two neighboring rollers 24. Formations in the form of ridges 38 in the exterior surfaces of jaw members 34 are provided to improve the gripping of the internal surface of the tubular core or other member to be gripped (not shown). Longitudinally aligned, circumferential grooves 40 are provided in the outer surface of each of the jaw members 34. In one jaw member (i.e., 34a) each groove is provided with a barrier 42. A spring steel band 44 is disposed in each set of aligned grooves with opposite band ends on opposite sides of the barrier 42.

Figure 4:
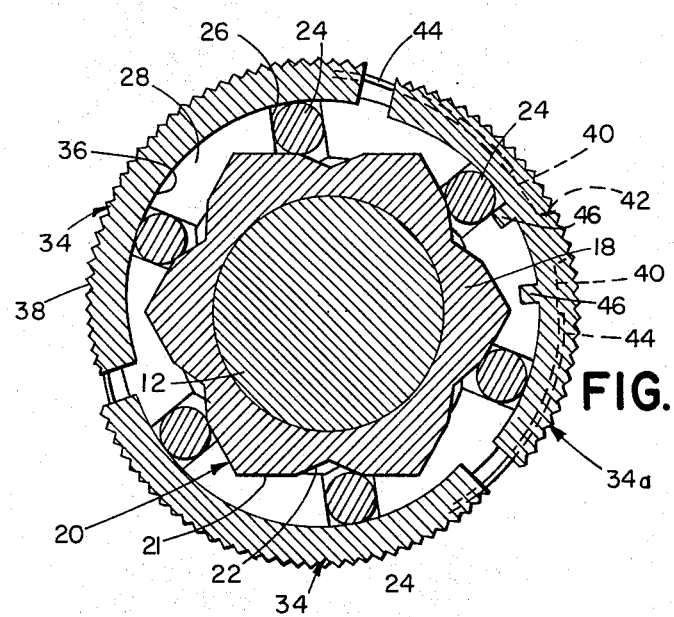
FIG. 4 is a view similar to FIG. 2 with the chuck jaw members expanded.
Figure 5:
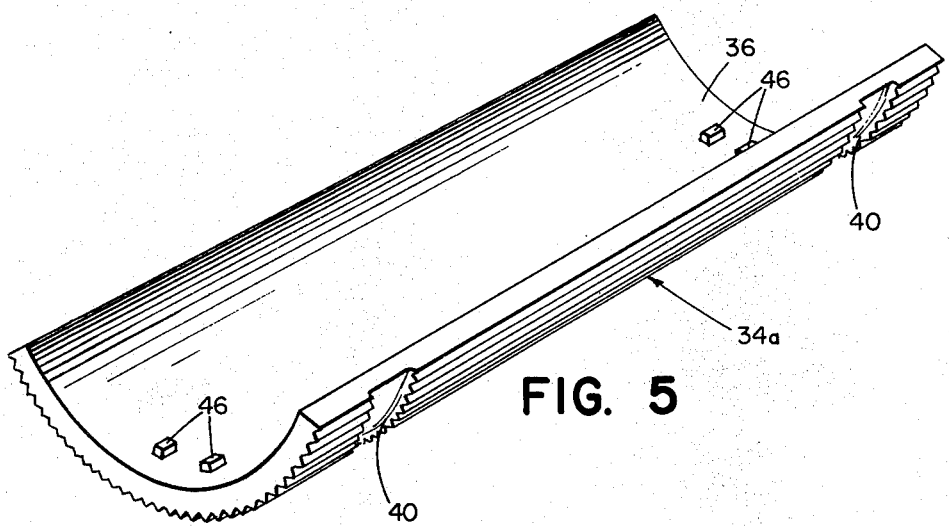
FIG. 5 is a perspective view of a jaw member constructed according to the present invention.

The jaw member 34a is also provided with axially spaced pairs of lugs 46 which project radially inwardly from the arcuate interior surface 36 for a distance equal to at least one half the diameter of the rollers 24. The lugs of each pair are circumferentially spaced and, in the assembled chuck, the two rollers supporting jaw member 34a are both exterior the lugs of each pair (see FIGS. 2 and 4). Recesses 48 are provided in the hexagonal surface of interior member 20 and are axially aligned with the respective pairs of lugs 46 so that the interior member will not interfer with lugs of desirable size. In operation, the chuck 10 is placed on shaft 12 and secured thereto by tightening set screws 14. A conventional roll collar (not shown) is fixed to the shaft near one end thereof. The shaft 12 and chuck 10 are then inserted within the tubular core (not shown) to be gripped until the core abuts the collar (thus positioning the core axially). A second collar is fixed to the shaft to abut the other end of the core. A braking or motive force is applied to the core (and the roll of material wound thereabout) from the shaft 12 through the chuck 10 as follows. With the shaft 12 and chuck 10 inserted into the tubular core, the weight of the core (and any material wound thereon) will bear upon the jaw member(s) 34 which happen to be facing upward on the top side of the chuck 10. Any relative rotation between the core and the shaft 12 will cause a relative rotation of the jaw members 34 with respect to the interior member 20 since the latter is secured to the shaft 12 by set screws 14 and since frictional engagement of the uppermost jaw member(s) with the core causes the jaw members (linked by bands 42) to assume the motion of the core. The rollers 24, in contact with both interior member 20 and a jaw member 34, roll on the relatively moving surfaces 21, 36 toward an apex of the hexagon. Since the rollers are hard and substantially incompressible, as they roll into the regions of the apexes of the hexagon (where the separation of surfaces 21 and 36 was less than he diameter of the rollers) they force the resiliently restrained jaw members radially outward against the resistance of the bands 44 thus forcing the formations 38 to grip the core. The roller orienting rings 28 assure the simultaneous circumferential displacement of all rollers 24 and the consequent simultaneous radial movement of all jaw members 34 so as to uniformly and securely grip the inner surface of the tubular core.

The arcuate shape of jaw member 36 and the disposition of the faces 21 produce a greater radial movement of the jaw members (and consequent greater gripping of the tubular core) as a greater rotational displacement of jaw members 34 and interior member 20 is produced. Owing to soley rolling friction between rollers 24 (i.e., all structure between the interior member and the jaw members) and both surfaces 36 and surfaces 21, however, there is almost no wear on the parts of the chuck despite the tremendous forces which are involved when a very heavy roll of material is wound on the particular tubular core. The use of rollers also provides for continuous automatic adjustment of the gripping force with changes in force applied to the shaft or tubular core. Furthermore, when the forces causing the rotational displacement of the shaft 12 and the tubular core are withdrawn, the rollers are free to roll back to their neutral (i.e., central) positions on the faces 21. The depressions 22 aid in this return of the rollers to the position shown in FIG. 2. The depressions also increase the total incremental expansion of the jaws from their neutral or retracted positions to their fully extended positions, thereby giving more expansion so as to be useable with cores of a range of diameters.

The radial dimension of roller-retaining rings 28 is chosen (for rollers 24 of a given diameter) such that the reduced area portions of the recesses 26 are less than a roller diameter (measured radially) from the apexes formed by the intersection of adjacent faces 21. This construction assures that the rollers 24 cannot pass over the apexes and onto the neighboring face 21 even if the enormous forces involved (and/or the softness of the core material) might have forced the jaw members radially outward engough for that to happen. (For a radially thicker ring 28, the recesses 26 would not open into surface 30 but would terminate interior of surface 30 at an appropriate depth to achieve the desired limitation in radial movement of rollers 24.)

It has been found that without the provision of lugs 46 on at least one of the jaw members (i.e., 34a) the set of jaw members tends to "walk" around the set of rollers in the underlying interior member. With the provision of such lugs, however, the orientation of jaw member 34a with respect to the set of rollers (themselves constrained with respect to each other by the rings 28) is maintained. Since the lateral edges of the various jaw members 34 will be radially aligned, it is sufficient to maintain the orientation of a single jaw member (i.e., member 34a) to prevent the undesirable "walking" of the set of jaw members as a whole. The "walking" phenomenon is undesirable for various reasons, including the possibility that one or more rollers will at any given time be aligned with the slight gap between adjacent jaw members rather than bearing fully on a single jaw member's arcuate interior surface 36. It will be evident to those skilled in the art that other lug arrangements than that illustrated will accomplish the intended function.

It has also been found that the retaining bands 44 also tend to "walk" around the chuck with respect to the jaw members. The provision of split bands 44 and barriers 42 in the grooves 40 prevents this from occurring. It is important to prevent the "walking" of the bands 44 since, if an end of the band were adjacent a gap between jaw members when the chuck was in an expanded configuration (as in FIG. 4), upon retraction (to the configuration of FIG. 2) the band end could be forced underneath the jaw member.

It will be appreciated that the provision of exposed roller portions 35 and roller orienting rings 28 achieves a chuck construction which simultaneously accomplishes the desired roller orienting function while not requiring structure, disposed between the jaw members 34 and the hexagonal portion of the interior member, which would engage any of those members in sliding friction. Sliding friction, under the tremendous forces encountered in this region of core chucks, is clearly detrimental to the lifetime of the chuck. Furthermore, it is presently believed that elements which engage the polygonal portion of the interior member 20 are, in part at least, a cause of the fouling, and subsequent jamming, of core chucks which typically operate in very dirty environments (e.g., adjacent looms where minute fibers are constantly in the air).

While the operation of preferred embodiments of a chuck constructed according to the invention has been described as used with a conventional roll-supporting shaft (i.e., shaft 12), it will be apparent to those skilled in the art that numerous other environments for use of the chuck are possible (e.g., a number of chucks on a single shaft 12; a custom build shaft in which the planar faces 21 are integral with the remainder of the shaft; a pair of chucks engaging the tubular core at its ends and themselves attached to machine arms or a turret; etc.). It will also be apparent to those skilled in the art that numerous other embodiments are within the scope of the invention and the following claims.

I claim:

1. In a core chuck comprising an interior member having a longitudinal axis and including a plurality of generally planar exterior surfaces each parallel to said axis, a plurality of rollers, each roller parallel to and in contact with one of said generally planar surfaces, a plurality of jaw members, each jaw member having an arcuate interior surface in contact with at least one of said rollers, and means for resiliently maintaining said jaw members in contact with said rollers, the improvement comprising the provision of jaw orientation means which limit the relative rotational movement, around said axis, between a jaw member and an underlying roller, said jaw orientation means comprising a lug secured to said jaw member and projecting inwardly from the inner surface of said jaw member.

2. A core chuck as claimed in claim 1 wherein said jaw orientation means comprise two such lugs, said lugs being longitudinally spaced.

3. A core chuck as claimed in claim 2 wherein said lugs are circumferentially aligned with each other with respect to said axis.

4. A core chuck as claimed in claim 1 wherein each said jaw member is in contact with at least two of said rollers, said jaw orientation means comprising a plurality of lugs projecting radially inwardly from the inside surface of said jaw member, said lugs being circumferentially spaced from each other with respect to said axis.

5. A core chuck as claimed in claim 4 wherein said plurality of lugs are substantially axially aligned with each other, said jaw orientation means further including a second like plurality of axially aligned lugs, each lug of said second plurality being circumferentially aligned with a lug of said first mentioned plurality, the lugs of said second plurality being longitudinally spaced from those of said first plurality.

6. A core chuck as claimed in claim 5 wherein there are exactly twice as many rollers as jaw members, each of said pluralities of lugs consistings of two lugs.

7. A core chuck as claimed in claim 2 wherein said lug projects inwardly from said jaw member at a predetermined longitudinal position on said jaw member, and said interior member has a recess in at least a portion of its surface, said recess being axially aligned with said lug.

8. A core chuck as claimed in claim 1 wherein said means for resiliently maintaining said jaw members in contact with said rollers comprise a circumferentially disposed groove in the outer surface of each of said jaw members, said grooves being axially aligned, one of said grooves being interrupted by a barrier, and a band spring disposed in said grooves, opposite ends of said band being disposed on opposite sides of said barrier.

9. A core chuck as claimed in claim 8 wherein said barrier is integral with the remainder of said jaw member.

10. A core chuck as claimed in claim 8 wherein each jaw member has a second longitudinally spaced groove cut in its outer surface, said second grooves being axially aligned, a barrier being provided in one of said second grooves, and a band spring being disposed in said second grooves with opposite ends lying on opposite sides of said barrier in said second groove.

11. In a core chuck comprising an interior member having a longitudinal axis and including a plurality of generally planar exterior surfaces each parallel to said axis, the exterior shape of said interior member in its axially central region in a cross-section taken perpendicular to said longitudinal axis being a regular polygon having at least six sides, a plurality of rollers, each roller parallel to and in contact with one of said generally planar surfaces, a plurality of jaw members, each jaw member having an arcuate interior surface, the number of jaw members being equal to or less than ½ the number of sides of said polygon, the interior surface of each said jaw member being in contact with at least two of said rollers, and means for resiliently maintaining said jaw members in contact with said rollers, the improvement comprising the provision of jaw orientation means for limiting the relative rotational movement, around said axis, between a jaw member and the underlying rollers, said jaw orientation means comprising first and second pairs of circumferentially spaced lugs projecting radially inwardly from said inner surface of said jaw member, each of the lugs of said second pair being aligned with a lug of said first pair, said second pair of lugs being longitudinally spaced from said first pair of lugs.

12. In a core chuck comprising an interior member having a longitudinal axis and including a plurality of generally planar exterior surfaces each parallel to said axis, the exterior shape of said interior member in its axially central region in a cross-section taken perpendicular to said longitudinal axis being a regular polygon having at least six sides, a plurality of rollers, each roller parallel to and in contact with one of said generally planar surfaces, a plurality of jaw members, each jaw member having an arcuate interior surface, the number of jaw members being equal to or less than ½ the number of sides of said polygon, the interior surface of each said jaw member being in contact with at least two of said rollers, and means for resiliently maintaining said jaw members in contact with said rollers, the improvement comprising the provision of jaw orientation means for limiting the relative rotational movement, around said axis, between a jaw member and the underlying rollers, said jaw orientation means comprising a first pair of circumferentially spaced lugs projecting inwardly from said inner surface of said jaw member and a second pair of lugs projecting radially inwardly from said inner surface of said jaw member, each of the lugs of said second pair being aligned with a lug of said first pair, said second pair of lugs being longitudinally spaced from said first pair of lugs, said axially central region of said interior member confined to the longitudinal region between said first and second pairs of lugs, the cross-sectional shape of said interior member outside of said axially central region being circular and having a diameter of less than the diameter of a reference circle drawn tangent to the apexes of said regular polygon.

13. A core chuck as claimed in claim 12 further including roller retaining means engagable with each said roller to maintain a predetermined circumferential spacing of said rollers and to limit the radial movement of each said roller.

14. A core chuck as claimed in claim 13 wherein said roller retaining means comprises a pair of rings, each ring disposed around a circular cross-section end portion of said interior member and including a plurality of circumferentially spaced recesses for receiving the end portion of each said roller in a said ring recess.

15. In a core chuck having a longitudinal axis and comprising a plurality of exterior, radially movable jaw members and interior means for applying to said jaw members a radially outward force in response to a relative rotation between said jaw members and said interior means, the improvement wherein said jaw members are movable circumferentially around said axis relative to said interior means and a lug is secured to one of said jaw members and projects inwardly therefrom and limits the circumferential movement of said one jaw member relative to said interior means.

* * * * *